United States Patent [19]

Christian et al.

[11] Patent Number: 4,549,293

[45] Date of Patent: Oct. 22, 1985

[54] TIME DIVISION MULTIPLE ACCESS COMMUNICATIONS SYSTEM

[75] Inventors: J. Robert Christian, Oceanport; Louis C. Poli, Hazlet, both of N.J.

[73] Assignee: The United States of America as represented by the Secretary of the Army, Washington, D.C.

[21] Appl. No.: 566,767

[22] Filed: Dec. 29, 1983

[51] Int. Cl.⁴ .......................... H04J 3/16; H04J 3/06; H04B 1/00; H04B 7/00

[52] U.S. Cl. ..................................... 370/95; 370/104; 455/56

[58] Field of Search ................ 370/104, 100, 103, 95; 455/56, 53

[56] References Cited

U.S. PATENT DOCUMENTS

| | | | |
|---|---|---|---|
| 3,908,088 | 9/1975 | Gutleber | 179/15 BC |
| 4,004,098 | 1/1977 | Shimasaki | 370/104 |
| 4,004,225 | 1/1977 | Gänssonantel | 370/104 |
| 4,054,753 | 10/1977 | Kaul et al. | 370/104 |
| 4,301,530 | 11/1981 | Gutleber | 370/103 |

Primary Examiner—Douglas W. Olms
Assistant Examiner—Frank M. Scutch, III
Attorney, Agent, or Firm—Anthony T. Lane; Jeremiah G. Murray; Edward Goldberg

[57] ABSTRACT

A covert line of sight time division multiple access communications system comprised of a plurality of geographically separated transceivers consisting of identical hardware and capable of operating either as a master station or a slave station, and when desirable as a repeater station. The system operates with a non-committed master station operating within a predetermined power circle of operation whereby multiple slave stations and/or repeaters communicate with each other by way of the master station in a one half duplex mode at a single frequency in the millimeter wave frequency range between 54 and 58 GHz.

13 Claims, 10 Drawing Figures

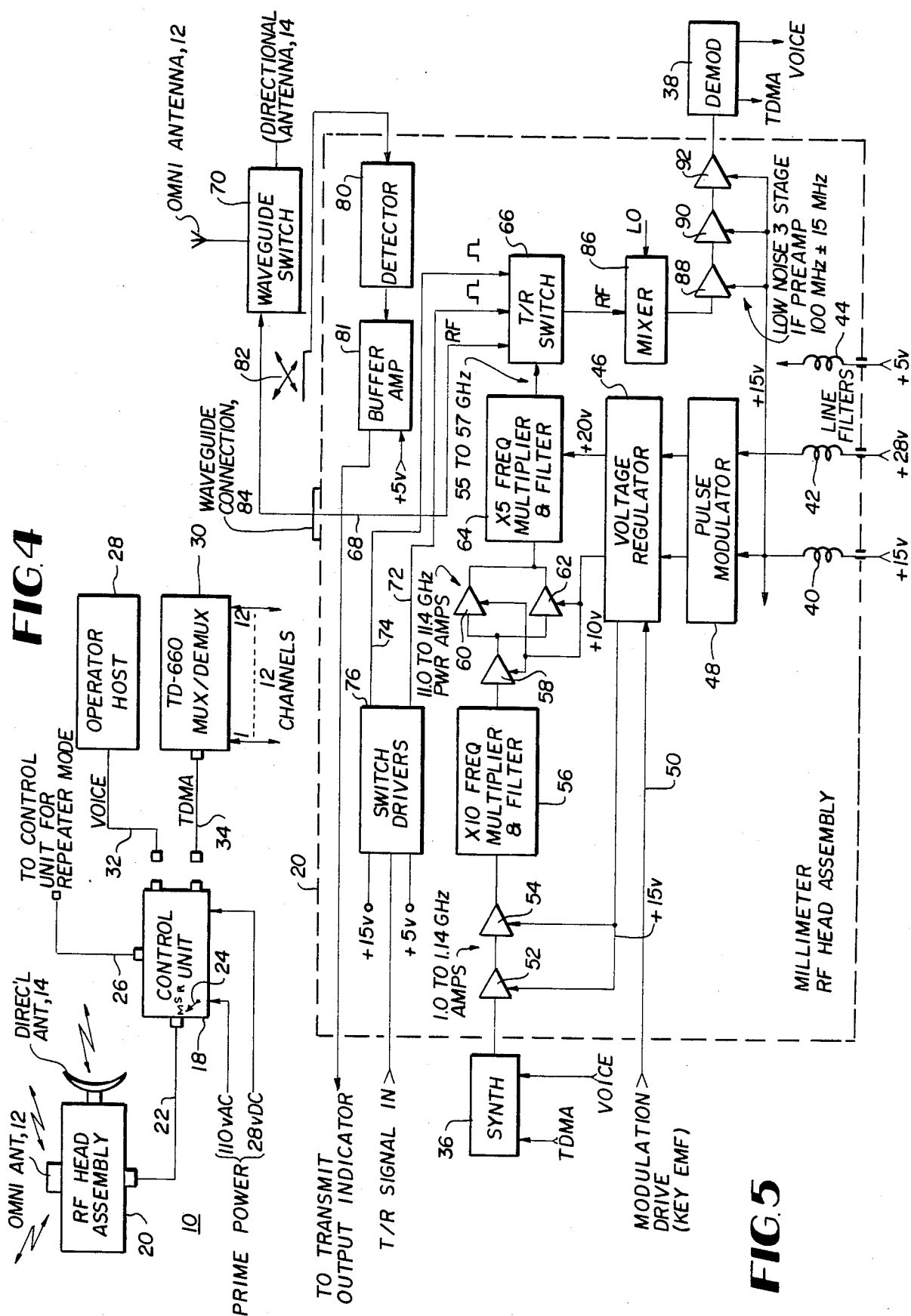

4,549,293

TIME DIVISION MULTIPLE ACCESS COMMUNICATIONS SYSTEM

The invention described herein may be manufactured, used and licensed by or for the Government for governmental purposes without the payment of any royalties thereon or therefor.

FIELD OF THE INVENTION

This invention relates generally to wireless communications systems and more particularly to a covert, relatively short range time division multiple access communications system involving a plurality of identical radio transceivers selectively operating as a master station and slave stations linked together through the selected master station.

BACKGROUND OF THE INVENTION

Time division multiple access communications (TDMA) systems comprised of a plurality of geographically separated radio transceivers which communicate with one another through a master station are generally known. The slave stations do not have direct radio contact with each other, but communicate through the master station in a designated time slot within a channel frame period. Also the master station is a piece of apparatus specifically designed to provide control and synchronization and is normally dedicated for that purpose. Typical examples of such systems are shown in U.S. Pat. No. 3,908,088, "Time Division Multiple Access Communications System", Frank S. Gutleber, Sep. 23, 1975, and U.S. Pat. No. 4,301,530, "Orthogonal Spread Spectrum Time Division Multiple Accessing Mobile Subscriber Access System", Frank S. Gutleber, Nov. 17, 1981. If the master or central station in these systems becomes inoperable, the entire network becomes useless or at least is impaired to the point where it is substantially useless.

Accordingly, it is an object of the invention to provide an improvement in radio communications systems.

It is another object of the invention to provide an improvement in time division multiple access communications systems.

A further object of the invention is to provide a time division multiple access communications system wherein covert operation is provided between multiple slave stations by way of a master station.

Still a further object of the invention is to provide an improvement in time division multiple access communications systems which include a plurality of user stations, any one of which is capable of operating as a master station.

And yet a further object of the invention is to provide improvement in time division multiple access communications systems wherein a plurality of slave stations communicate with each other by way of a master station while utilizing a single frequency.

SUMMARY

The foregoing as well as other objects of the invention are provided in a time division multiple access communications system comprised of a plurality of identically implemented transceivers geographically separated from one another, with each being capable of operating as a master or slave station and wherein one of the transceivers is selected, on demand, to act as the master station whereupon the other stations operate as slave stations and which thereafter are linked together through the selected master station to provide multiplexed digital channel and/or voice communications. Covert operation is further provided by operating the stations in a half duplex mode at a common frequency in the millimeter range of the electromagnetic spectrum and more particularly in the 54 GHz–58 GHz frequency band, a region of high atmospheric signal attenuation. In each instance, the respective transceivers include both an omnidirectional antenna which is utilized when operating as a master station, and a directional antenna which is utilized when operating as a slave station. By coupling two transceivers together at the same location, a repeater station can be established whereby one directional antenna is directed to the master station while the other directional antenna is directed to another slave station.

BRIEF DESCRIPTION OF THE DRAWINGS

These and other features of the invention will become more readily understood from a consideration of the following description taken in connection with the accompanying drawings in which:

FIG. 4 is an electrical block diagram broadly illustrative of each transceiver making up the system configurations shown in FIGS. 1 through 3;

FIG. 5 is an electrical block diagram illustrative of the details of the RF head assembly shown in FIG. 4.

DETAILED DESCRIPTION OF THE INVENTION

Figure 1:
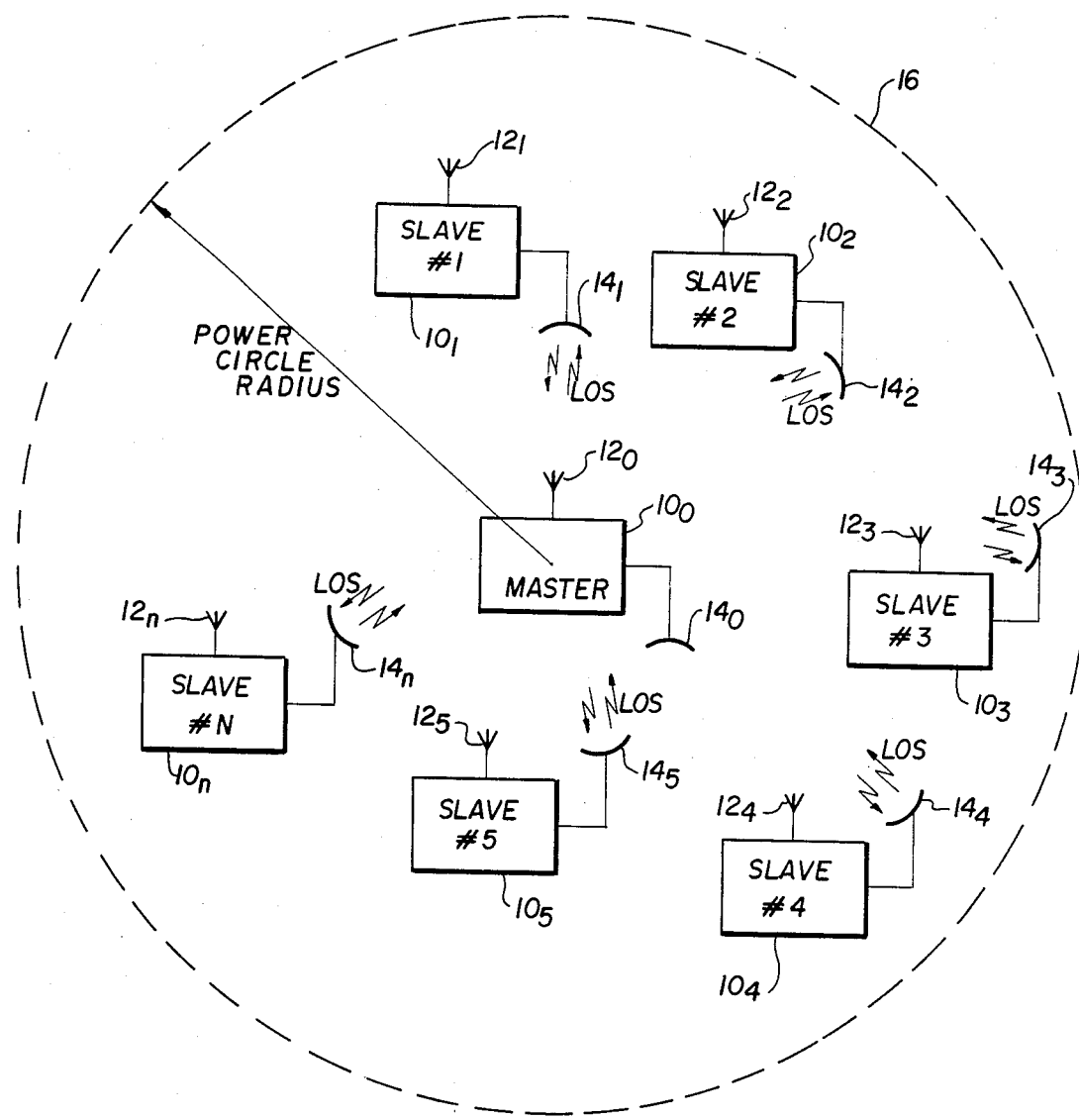
FIG. 1 is a simplified diagram of a time division multiple access communications system generally illustrative of the subject invention.

Referring now to the drawings and more particularly to FIG. 1, shown therein is a first embodiment of a time division multiple access communications (TDMA) system comprised of a plurality of like transceivers $10_0 \ldots 10_n$ in that they are constructed of identical hardware, are mobile and can be selectively switched to operate either as a master station or as a slave station whereby all communications between the slave stations are coordinated by and pass through the master station. As shown, reference numeral $10_0$ refers to a transceiver designated the system master station through which 1 through n slave stations $10_1, 10_2 \ldots 10_n$ communicate with one another. Each transceiver, moreover, includes an omnidirectional antenna $12_0, 12_1, 12_2 \ldots 12_n$ and at least one directional antenna $14_0, 14_1, 14_2 \ldots 14_n$. The master station $10_0$ communicates with slave stations $10_1, 10_2 \ldots 10_n$ by means of its omnidirectional antenna $12_0$ while the slave stations $12_1, 12_2 \ldots 12_n$ communicate with the master station $10_0$ by their respective directional antennas $14_1, 14_2 \ldots 14_n$.

The transceivers $10_0 \ldots 10_n$ operate to transmit and receive at the same frequency in the millimeter wave frequency band, a region of high atmospheric signal attenuation, between 54 GHz and 58 GHz which is near the oxygen absorption line of the spectrum and thus provides extremely wide bandwidths and covert operation for either multiplexed, multichannel communication or single channel voice communication in the form of digital word bursts. While line of sight (LOS) communication is required between the master station $10_0$ and any slave station $10_1 \ldots 10_n$, line of sight is not required between the slave stations themselves due to the fact that all communication between slave stations is through the master station. Accordingly, at millimeter wave frequencies, a covert power circle 16 having, for example, a one kilometer radius is generated around the master station $10_0$ which provides covert communications between all members $10_1 \ldots 10_n$ within the power circle 16.

Whereas TDMA systems of the known prior art include a singularly dedicated master station specifically designed for the purpose of acting as a master station and whereas the slave stations are specifically designed to act as slave stations, the present invention departs from such a conventional concept in that, upon demand, any of the slave stations $10_1, 10_2 \ldots 10_n$ can be subsequently designated as a new master station in the event that the originally designated master station $10_0$ becomes inoperative for any number of reasons. This becomes particularly advantageous when used by the military under battlefield conditions.

Figure 2:
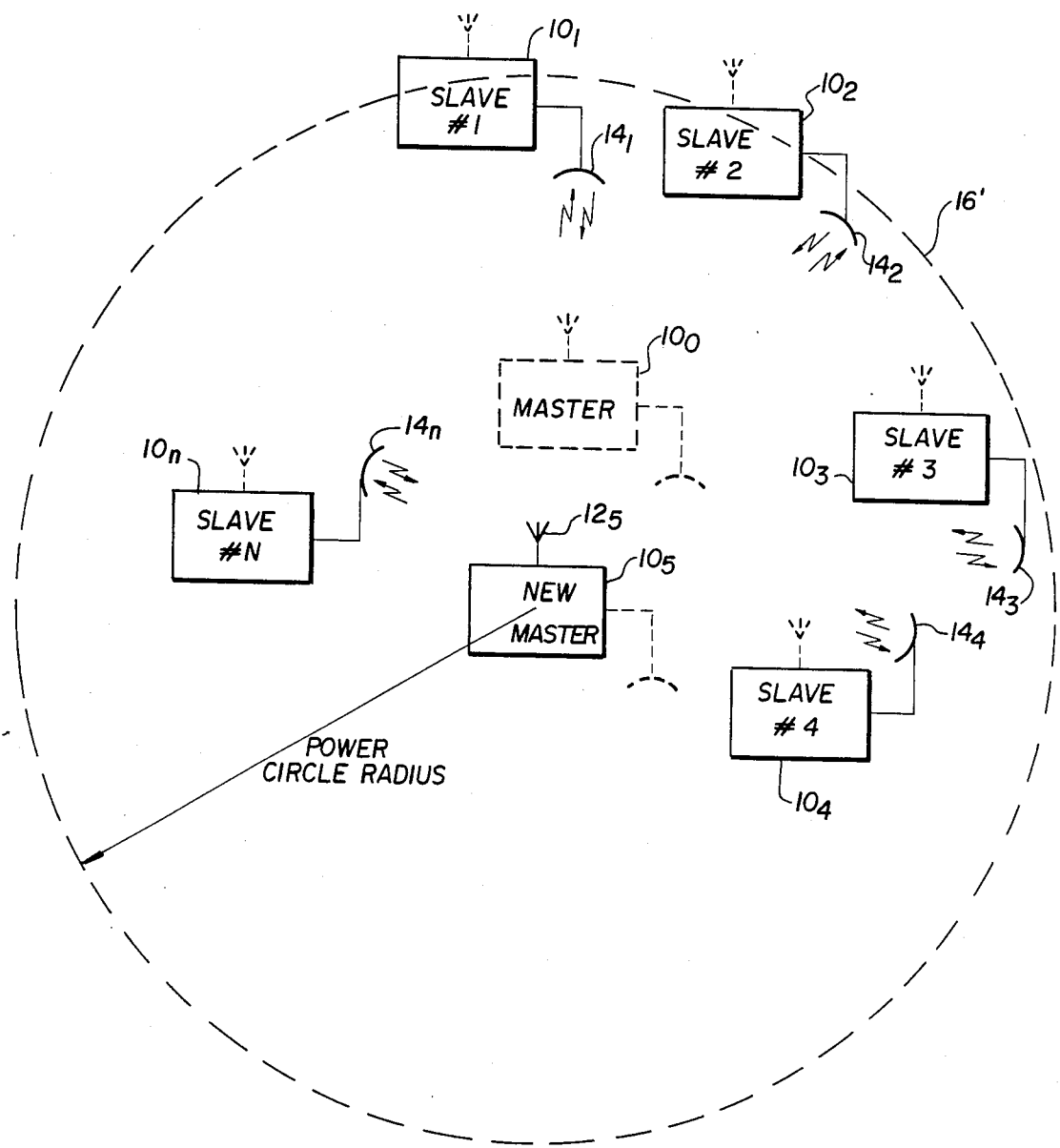
FIG. 2 is a simplified diagram further illustrative of the subject invention.

This now leads to a consideration of FIG. 2 wherein transceiver $10_5$ is now designated the new master station due to the fact that the original master station $10_0$ becomes inoperable or has been put out of action, e.g. destroyed, as shown by the phantom lines. Now the slave stations $10_1 \ldots 10_4, 10_6 \ldots 10_n$ communicate to the omnidirectional antenna $12_5$ of the new master station $10_5$ via their respective directional antennas $14_1 \ldots 14_4, 14_6 \ldots 14_n$. Additionally, the covert power circle has shifted from that shown by reference numeral 16 as shown in FIG. 1 to a new power circle 16' whose radius originates at the new master station $10_5$.

Figure 3:
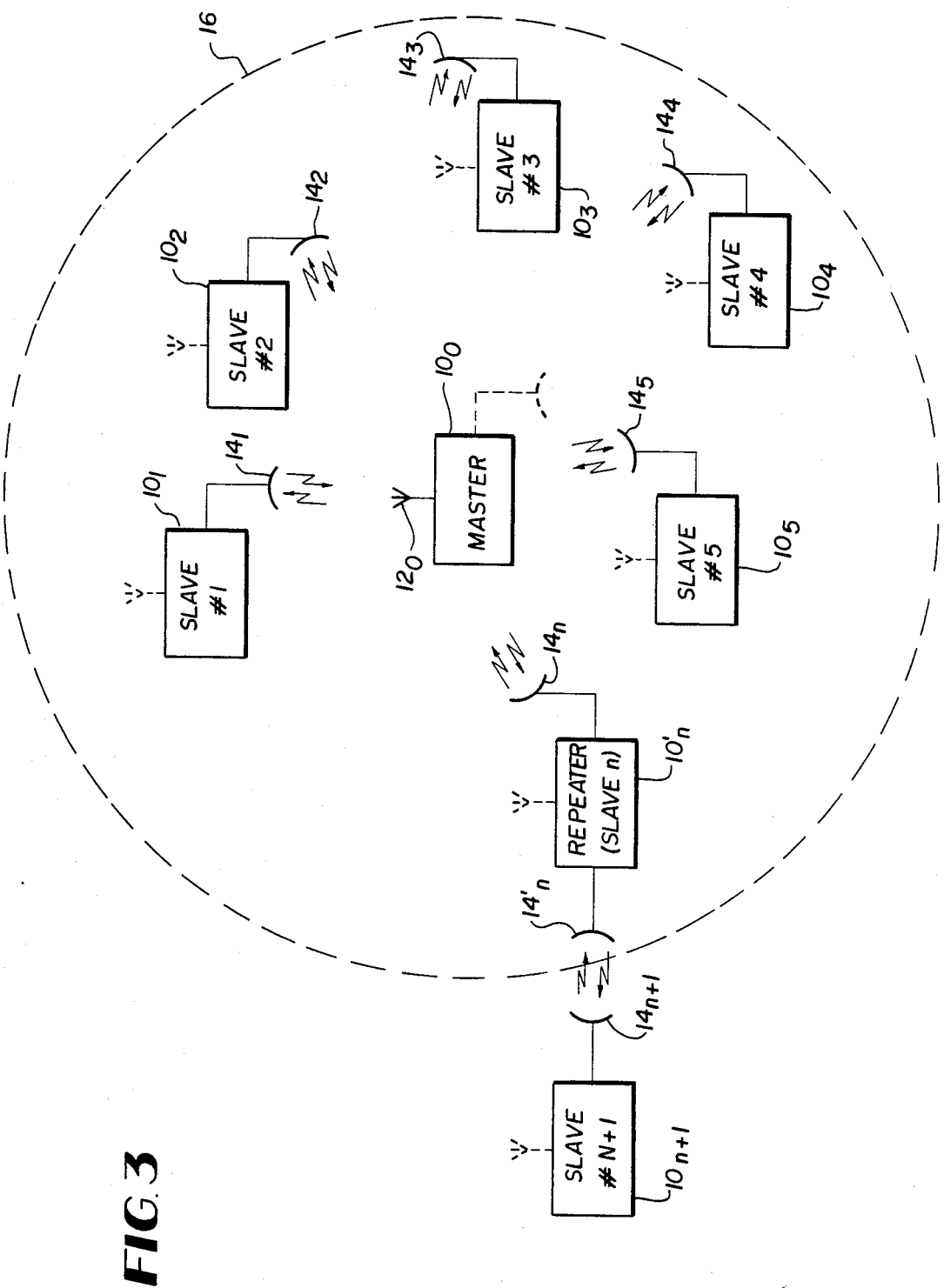
FIG. 3 is a simplified diagram also further illustrative of the subject invention.

Since the system of the subject invention normally provides communication between the slave stations $10_1 \ldots 10_n$ within the power circle 16, any transceiver, for example, station $10_n$ can further be converted into a repeater station $10'_n$ as shown in FIG. 3, whereby a like transceiver $10_{n+1}$ as the slave stations $10_1, 10_2, 10_3$ can access the system through the master station $10_0$ and its omnidirectional antenna $12_0$. In order to implement this mode of operation, the repeater station $10'_n$ is configured from two colocated transceivers $10_n$ which are connected together so as to include a second directional antenna $14'_n$ which is directed at the directional antenna $14_{n+1}$ of a slave transceiver $10_{n+1}$ which lies outside of the power circle 16.

As noted above, the system operates at a single frequency in a half duplex mode with digital word bursts being provided between participating stations through the master station as shown in FIGS. 6A–6E and which will be considered subsequently. Since a single frequency is used among all participating stations, a conservation in bandwidth is achieved. Also, it permits the system operating frequency to dynamically move without a great deal of difficulty and thus permits the utilization of relatively unsophisticated hardware while providing protection against undesired interception and jamming. Moreover, due to the likeness of all of the apparatus, an extremely mobile TDMA line of sight communications system comprised of multiple geographically separated transceivers having a non-committed master station operating within a predetermined power circle is achieved.

Having thus considered the system details of the subject invention, direction is now turned to the details of the transceivers $10_0 \ldots 10_n$. Referring now to FIG. 4, reference numeral 10 designates radio apparatus for implementing the transceivers $10_0 \ldots 10_n$ and is comprised of a control unit 18 which is connected to an RF head assembly 20 by means of a multi-conductor cable 22. The RF head assembly 20 is shown in further detail in FIG. 5 and will be considered subsequently. FIG. 4, however, is intended to show that the RF head assembly 20 is separated from the control unit 18 and is adapted to be mounted on top of a mast or tripod located, for example, on a mobile vehicle, not shown, for selectively coupling energy to and from an omnidirectional antenna 12 or a directional antenna 14. The control unit 18 is also adapted to be located on or in the vehicle and includes, among other things, a manually operable control switch 24 which is operable to switch the operational mode of the apparatus so as to operate either as a master station or a slave station and, when desirable, as a repeater station. In the master and slave operational modes, only a single piece of apparatus is shown in FIG. 4 as utilized; however, in the repeater mode, the control unit 18 as well as the RF head assembly 20 including the omnidirectional antenna 12 and directional antenna 14 is duplicated and electronically connected together by means of a multi-conductor cable assembly 26 so that, for example, energy transmitted to one directional antenna 14 can be coupled to and from the other directional antenna, not shown, on the other RF head assembly, also not shown, through the cable assemblies 22, 26 and respective control units 18 to provide a double directional antenna configuration as shown in FIG. 3 with respect to the repeater station $10'_n$. The omnidirectional antennas 12 in both head assemblies are not used in the repeater mode.

Further as shown in FIG. 4, the control unit 18 has two power supply potentials, 110 volts AC and 28 volts DC, applied thereto. These power supply potentials are fed to well known supply circuits, not shown, to generate the necessary power voltages for operating, for example, signal amplifiers and switching devices within the transceiver apparatus. The control unit 18, moreover, is adapted to be coupled to an operator hand set 28 and/or a multi-channel multiplexer-demultiplexer unit 30 via respective cable assemblies 32 and 34. Thus the control unit 18 provides the required interconnection between the RF head assembly 20 and the operator hand set 28 as well as the multiplexer-demultiplexer 30 or both. In order to communicate these signals, the control unit 18 additionally includes a synthesizer 36 shown in FIG. 5 which is operable to convert the TDMA and voice input signals to digital burst signals having a carrier frequency in the GHz range from 1.0 to 1.14 GHz, for example, where they are further multiplied up to the millimeter wave (55 to 57 GHz) RF frequency in the head assembly 20. However, it should be noted that, when desired, other known means of achieving the necessary millimeter wave frequencies can be utilized. The head assembly 20 is further adapted to convert received RF signals from the master station to an IF frequency where they are then fed to a demodulator 38 in the control unit 18 to provide output TDMA or voice communications signals back to the multiplexer-demultiplexer 30 or operator hand set 28.

Turning attention now to FIG. 5 which discloses a typical example of achieving the required millimeter wave transceiver and considering the details of the RF head assembly shown therein, all of the input and output signals connected thereto as well as the power supply potentials are included in the multiconductor cable 22 shown in FIG. 4. The control unit 18, moreover, includes power supply circuitry, not shown, which is adapted to generate in this case +15 VDC, +28 VDC, and +5 VDC. These DC power supply potentials are coupled into the RF head assembly 20 by means of respective line filters 40, 42 and 44. The +15 VDC and +28 VDC supply potentials are coupled to a voltage regulator 46 through a pulse modulator which is used only in the slave mode to provide regulated +15 VDC, +10 VDC and +20 VDC power supply potentials. The voltage regulator 46, moreover, is adapted to be operated in a keyed mode by a modulation drive input signal applied via signal lead 50 during TDMA operation in order to deactivate the transmitter portion of the transceiver during the receive mode. The signal output from the synthesizer 36 is fed to a pair of bi-polar transistor amplifiers 52 and 54 which operate, for example, in the 1.0 to 1.14 GHz range for providing amplification of the TDMA and voice signal digital inputs which are then fed to a frequency multiplier and filter 56 which is operable to multiply the frequency by a factor of 10 (X10) to provide an output of signals in a range of 11.0 to 11.4 GHz. These signals are next fed to three power field effect transistor amplifiers 58, 60 and 62. The outputs of the amplifiers 60 and 62 are commonly fed to a second frequency multiplier and filter 64 comprised of, for example, an avalanche diode which operates to increase the frequency by a factor of five (X5). Accordingly, a 55 to 57 GHz RF signal is coupled to a transmit-receive (T/R) switch 66 implemented, for example, by means of a PIN diode. The T/R switch 66 is coupled by means of a waveguide transmission line 68 to a waveguide switch 70 which is mechanically switchable between the omnidirectional antenna 12 and the directional antenna 14, depending upon whether the equipment is being utilized as a master station or a slave station. The T/R switch 66 is driven by means of two pulse type signals appearing on circuit leads 72 and 74 from a switch driver circuit 76 having +15 VDC and +5 VDC supply voltages applied thereto in addition to a T/R input signal from the control unit 18.

In the transmit mode, a portion of the RF signal coupled to the waveguide 68 is fed to an RF detector 80 through an RF coupler 82 inserted in the waveguide transmission line intermediate the waveguide switch 70 and a waveguide connection 84 out of the RF head assembly 20. The output of the detector 80 is fed to a buffer amplifier 81 which provides a signal to a transmit output indicator, not shown, located, for example, on the control unit 18. In the receive mode, the output of the T/R switch is fed to a mixer 86 along with a local oscillator input signal (LO) which provides an IF output signal having a frequency in the order of, for example, 100 MHz±15 MHz. The IF output signal is next fed to a three stage low noise IF preamplifier comprised of amplifiers 88, 90 and 92 coupled together in series with the output of the third preamplifier 92 being coupled to the demodulator 38 in the control unit 18.

As noted above, a single frequency is used in a half duplex mode for transmitting digital burst signals between communicating stations and time division multiple access is used to enable the member stations to communicate with each other through the system master station. A typical TDMA time frame and subdivisions thereof is shown in FIGS. 6A through 6E.

Figure 6A:
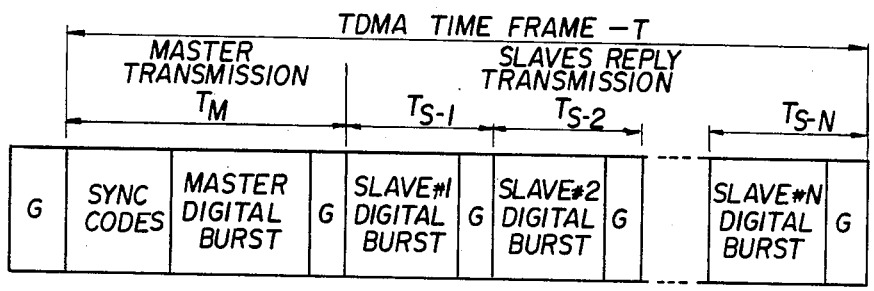
FIGS. 6A through 6E are a set of time diagrams helpful in understanding the time division multiple access operation of the subject invention.
Figure 6B:
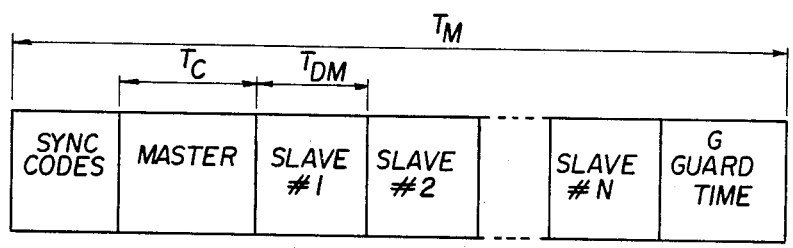

As shown in FIG. 6A, the TDMA time frame is divided into a master transmission time $T_m$ and a plurality of slave reply transmission times $T_{s-1}, T_{s-2} \ldots T_{s-n}$. It is to be noted that a dead or guard time G is spaced between the individual master and slave transmission and has for its purpose the allowing for different propagation delays to the member slaves and to avoid multi-path interference. The master transmission time $T_m$ is further shown in FIG. 6B and includes a time slot (SYNC) containing synchronizing codes to assure synchronization with the listening slave stations. Following this, a digital data burst in the time $T_c$ is transmitted containing data relating to system control and channel routing. Following this, sequential data bursts $T_{dm}$ are transmitted containing the actual multiplexed system channels 1 through n followed by the guard time G. Digital voice communications signal burst would appear within any of the channel bursts, e.g. the channel n burst. The time $D_m$ is further shown in FIG. 6D.

Figure 6C:
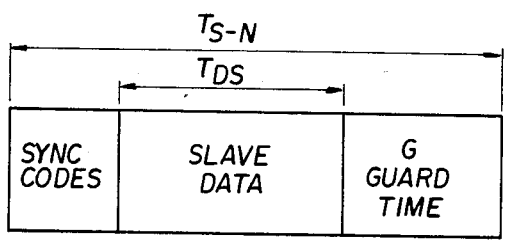
Figure 6D:
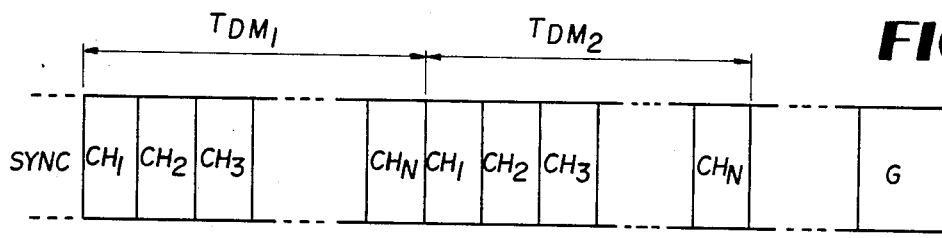
Figure 6E:
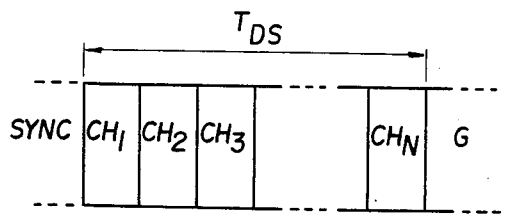

With respect to the slave reply transmission time, FIG. 6C discloses one such time. As shown, the period $T_{s-n}$ includes a time (SYNC) wherein sync codes are transmitted to the master station followed by a data burst time $T_{ds}$ which includes the various channel transmission times as shown in FIG. 6E followed by the guard time G. This technique and format is well known to those skilled in the art and is simply disclosed herein to provide one with the manner in which the system is operated while utilizing a millimeter wave RF medium and a non-committed replaceable master station in a TDMA communications system employing a plurality of identical transceivers which are selectively adapted to operate at either a slave station or a master station within a covert power circle which establishes the maximum range of master-slave communications.

It is to be noted that the foregoing detailed description has been made by way of illustration and not limitation, and accordingly all modifications, alterations and changes coming within the spirit and scope of the invention as set forth in the appended claims are meant to be included.

We claim:

1. A time division multiple access communication system including a non-permanently committed master station and at least two slave stations communicating with one another through the master station, comprising:

a plurality of indentical transceivers utilizing the same operational frequency near a region of high atmospheric signal attenuation, one of said transceivers operating a master station and the other transceivers operating as slave stations within line of sight communication to said master station, each of said transceivers including an omnidirectional antenna providing operation as a master station and a directional antenna providing operation as a slave station, and means for selectively connecting one of said antennas for operation of each transceiver as a master station capable of communication with each slave station or as a slave station capable of communication only with said master station, and wherein said one transceiver operating as the master station establishes a covert power circle of operation with the remainder of said transceivers acting as slave stations geographically located within said circle to establish a line of sight communications link with the master station but being selectively operable upon demand to act as a master station in the event the previously selected master station becomes inoperable.

2. The system as defined by claim 1 wherein said operational frequency is in the region of the oxygen absorption line of the spectrum.

3. The system as defined by claim 1 wherein said operational frequency is in the millimeter wave portion of the electromagnetic spectrum.

4. The system as defined by claim 3 wherein said slave stations communicate with said master station and said master station communicates with said slave stations in a half duplex mode of operation of alternating master-slave transmissions in the frequency band between 54 GHz and 58 GHz.

5. The system as defined by claim 4 wherein said alternate transmissions comprise alternating master-slave bursts in designated time slots of a time division multiple access time frame.

6. The system as defined by claim 3 wherein each transceiver is additionally comprised of an interconnected control unit and RF head assembly switchably coupled to said omnidirectional antenna and said directional antenna, said control unit having switch means for selectively rendering said transceiver a master station or a slave station and having means for receiving externally applied input communications signals which are coupled to said head assembly and thereafter radiated selectively from said omnidirectional antenna or said directional antenna, each said transceiver further having means for providing output communications signals received by either said omnidirectional antenna or said directional antenna.

7. The system as defined by claim 6 wherein said communications signals comprise a plurality of communications signals carried by a plurality of multiplexed signal channels within a time division multiple access time frame.

8. The system as defined by claim 7 wherein said communications signals additionally include voice communications signals.

9. The system as defined by claim 8 wherein said communications signals are in the form of digital burst signals.

10. The system as defined by claim 6 wherein said control unit additionally includes means for providing synchronization, channel routing, and system control for all slave stations when operating as a master station.

11. The system as defined by claim 6 wherein two colocated transceivers are directly coupled together by way of their respective control units for operating as a repeater station whereby a transceiver outside of said covert power circle of operation is linked to a slave station inside of said power circle through said repeater station and said master station.

12. The system as defined by claim 11 wherein said repeater station communicates with said station outside of said covert circle and said master station by respective directional antennas of said directly coupled transceivers.

13. The system as defined by claim 12 and wherein the control unit of said directly coupled transceivers includes switch means for interconnecting signals between said transceivers.

* * * * *